(12) United States Patent
Suzuki (10) Patent No.: US 11,847,142 B2
(45) Date of Patent: Dec. 19, 2023

(54) DOCUMENT ANALYSIS SYSTEM (71) Applicant: HONDA MOTOR CO., LTD., Tokyo (JP)

(72) Inventor: Takamasa Suzuki, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 259 days.

(21) Appl. No.: 17/181,576

(22) Filed: Feb. 22, 2021

(65) Prior Publication Data
US 2021/0263953 A1 Aug. 26, 2021

(30) Foreign Application Priority Data
Feb. 26, 2020 (JP) .................. 2020-030684

(51) Int. Cl.
*G06F 16/00* (2019.01)
*G06F 16/28* (2019.01)
(Continued)

(52) U.S. Cl.
CPC ............ *G06F 16/285* (2019.01); *G06F 16/93* (2019.01); *G06F 17/18* (2013.01); *G06F 40/279* (2020.01);
(Continued)

(58) Field of Classification Search
CPC ...... G06F 40/30; G06F 16/3329; G06F 40/20; G06F 16/21; G06F 16/3334; G06F 17/18; G06F 40/10; G06F 16/313; G06F 16/335; G06F 16/2477; G06F 3/0673; G06F 16/2228; G06F 16/3344; G06F 16/254; G06F 3/0631; G06F 16/258; G06F 16/2465; G06F 16/93; G06F 3/0604; G06F 16/36;
(Continued)

(56) References Cited

U.S. PATENT DOCUMENTS

2012/0239668 A1* 9/2012 Bhattacharyya ....... G06Q 10/10
707/E17.022
2016/0224900 A1* 8/2016 Steele, Jr. ............. G06F 9/5066
(Continued)

FOREIGN PATENT DOCUMENTS

JP 2015-503776 A 2/2015
JP 2015-153381 A 8/2015

*Primary Examiner* — Yicun Wu
(74) *Attorney, Agent, or Firm* — SQUIRE PATTON BOGGS (US) LLP (57) ABSTRACT

There is provided a system configured to appropriately determine a topic count in accordance with LDA to estimate latent meanings of a document. For a plurality of documents d, a perplexity PPL of each document d is evaluated in accordance with a document generation probability in which the document d is generated when topic counts N for defining a topic model based on the LDA as a document generation model are hypothetically specified as different values and word groups are specified by different random numbers. The topic model is defined by a reference topic count No determined by combining a first topic count $N_1$ (the number of topics indicating a highest cumulative frequency at which the perplexity PPL first indicates a minimum value) and a second topic count $N_2$ (the number of topics indicating a highest cumulative frequency at which the perplexity PPL indicates a smallest value).

6 Claims, 11 Drawing Sheets

(51) Int. Cl.
*G06Q 30/0203* (2023.01)
*G06Q 10/10* (2023.01)
*G06F 40/30* (2020.01)
*G06F 17/18* (2006.01)
*G06F 40/279* (2020.01)
*G06F 16/93* (2019.01)

(52) U.S. Cl.
CPC ............. *G06F 40/30* (2020.01); *G06Q 10/10* (2013.01); *G06Q 30/0203* (2013.01)

(58) Field of Classification Search
CPC .... G06F 16/319; G06F 40/166; G06F 16/285; G06F 16/35; G06F 40/284; G06F 9/5066; G06F 9/5061; G06F 40/279; G06F 16/355; G06N 7/005; G09B 5/02
See application file for complete search history.

(56) References Cited

U.S. PATENT DOCUMENTS

| | | | |
|---|---|---|---|
| 2019/0114319 A1* | 4/2019 | Tristan | G06N 20/00 |
| 2020/0184339 A1* | 6/2020 | Li | G06N 3/0445 |
| 2021/0089931 A1* | 3/2021 | Bellec | G06F 40/30 |
| 2021/0234816 A1* | 7/2021 | Zong | G06V 10/70 |

* cited by examiner

DOCUMENT ANALYSIS SYSTEM

BACKGROUND OF THE INVENTION

Field of the Invention

The present invention relates to a system for analyzing a plurality of documents.

Description of the Related Art

A technical method has been developed in which, when result evaluation is carried out by performing clustering with a heavy computation load such as the latent Dirichlet allocation (LDA) in accordance with a particular evaluation criterion, an akaike information criterion (AIC) value is computed as the appropriateness of the grouping in accordance with the evaluation criterion, a smallest number of clusters is searched for while the number of clusters is intermittently specified, and an optimum result is accordingly determined (refer to, for example, Japanese Patent Laid-Open No. 2015-153381). Another technical method has also been developed in which text is partitioned into sets and subsets of texts, each token in the text is associated with the usage of the shared vocabulary, topics, and subtopics in accordance with a probabilistic model and random variables, and clusters of words are discovered by using the LDA (refer to, for example, National Publication of International Patent Application No. 2015-503776).

However, since latent meanings of a document is estimated, there is a possibility that the topic count, which is the number of topics, is specified as an inappropriate value in accordance with the LDA.

An object of the present invention is to provide a system configured to appropriately determine a topic count in accordance with the LDA to estimate latent meanings of a document.

SUMMARY OF THE INVENTION

A document analysis system according to the present invention includes a perplexity evaluation element, a first topic count determination element, a second topic count determination element, and a reference topic count determination element. The perplexity evaluation element is configured to evaluate, for a plurality of documents, a perplexity of each document in accordance with a document generation probability in which the document is generated when topic counts based on LDA as a document generation model are hypothetically specified as different values and word groups are specified by different random numbers. The first topic count determination element is configured to add together frequencies at which the perplexity evaluated by the perplexity evaluation element first indicates a minimum value with respect to each of the word groups specified by the different random numbers and determine, as a first topic count, a particular topic count that indicates a highest cumulative frequency among the topic counts. The second topic count determination element is configured to add together frequencies at which the perplexity evaluated by the perplexity evaluation element indicates a smallest value with respect to each of the word groups specified by the different random numbers and determine, as a second topic count, a particular topic count that indicates a highest cumulative frequency among the topic counts. The reference topic count determination element is configured to determine a reference topic count by combining the first topic count determined by the first topic count determination element and the second topic count determined by the second topic count determination element.

The document analysis system having this configuration evaluates, for a plurality of documents, a perplexity of each document in accordance with a document generation probability in which the document is generated when topic counts for defining a topic model based on the LDA as a document generation model are hypothetically specified as different values and word groups are specified by different random numbers. A "first topic count", which is the number of topics indicating a highest cumulative frequency at which the perplexity first indicates a minimum value, and a "second topic count", which is the number of topics indicating a highest cumulative frequency at which the perplexity indicates a smallest value, can define a topic model that is a probabilistic model suitable to extract a latent topic from each document.

Hence, if only either one topic count defines the topic model, a latent meaning of a document, which can otherwise be estimated in accordance with the topic model defined by the other topic count, may be omitted. Thus, the topic model is defined in accordance with the reference topic count determined by combining the first topic count and the second topic count, and as a result, it is possible to establish a topic model more suitable to estimate the latent meaning of the document.

It is preferable that the document analysis system according to the present invention include a cumulative occurrence frequency evaluation element configured to evaluate, for a plurality of words included in the plurality of documents and topics of the reference topic count, a cumulative occurrence frequency of each word in each topic. It is also preferable that the cumulative occurrence frequency evaluation element be configured to determine whether at least one designated word of the plurality of words indicates the cumulative occurrence frequency equal to or less than a reference value in at least one topic of the topics of the reference topic count.

The document analysis system having this configuration evaluates the cumulative occurrence frequency of each word included in the plurality of documents with respect to each of the topics of the reference topic count. The "cumulative occurrence frequency" of a particular word is calculated by sequentially adding the occurrence frequencies of words from a word with a higher occurrence frequency to the particular word. As described above, the reference topic count is a number suitable to estimate the contextual meaning of each document. Thus, as the cumulative occurrence frequency of a particular word in a particular topic decreases, the probability that the contextual meaning of the particular word corresponds to the particular topic increases. As a result, in accordance with the evaluation result, in particular, the determination result of whether the cumulative occurrence frequency is equal to or less than the reference value, it is possible to highly accurately estimate the contextual meaning of a designated word in the documents used to establish the topic model.

It is preferable that the document analysis system according to the present invention further include a relative frequency evaluation element and a principal component analysis element. The relative frequency evaluation element may be configured to, when each of the plurality of documents regarding a plurality of items is assumed to be constituted by a plurality of topics of the reference topic count in accordance with the topic model, evaluate a relative frequency with respect to a combination of each of the plurality of items and each of the plurality of topics of the reference topic count. The principal component analysis element may be configured to evaluate a principal component vector of each of the plurality of topics and a principal component vector of each of the plurality of items by performing principal component analysis for the relative frequency evaluated by the relative frequency evaluation element with respect to a combination of each of the plurality of items and each of the plurality of topics for each of the plurality of items.

The document analysis system having this configuration evaluates the relative frequency of a combination of each item and each topic. The relative frequency of a combination of an item and a topic represents a frequency at which the topic occurs in terms of the item, and thus, by performing the principal component analysis for the relative frequency of each item, the correlation between each item and each topic can become tangible. Furthermore, it is possible to estimate the correlation between each item and each topic indicating the topic distribution determined in accordance with the topic model established by using the documents regarding the items.

It is preferable that in the document analysis system according to the present invention the principal component analysis element be configured to classify the plurality of topics under a plurality of principal component groups in accordance with at least either a polarity of a principal component constituting a principal component vector of each of the plurality of topics or a length of the principal component, and analyze a meaning of each principal component group in accordance with a word indicating a word occurrence frequency equal to or greater than a predetermined value in topics classified under the plurality of principal component groups.

With the document analysis system having this configuration, it is possible to highly accurately estimate the latent meaning of the plurality of documents about a particular item in accordance with the meaning of the principal component group including the particular item.

It is preferable that in the document analysis system according to the present invention the principal component analysis element be configured to classify the plurality of topics under the plurality of principal component groups including a first positive principal component group, a second positive principal component group, a first negative principal component group, and a second negative principal component group. In the first positive principal component group, a first principal component of the principal component vector may be positive and greater than a second principal component. In the second positive principal component group, the second principal component of the principal component vector may be positive and greater than the first principal component. In the first negative principal component group, the first principal component of the principal component vector may be negative and greater than the second principal component. In the second negative principal component group, the second principal component of the principal component vector may be negative and greater than the first principal component.

The document analysis system having this configuration can estimate the latent meaning of the plurality of documents about each item in two-dimensional plane.

It is preferable that in the document analysis system according to the present invention the principal component analysis element be configured to compare the plurality of items with each other with respect to the word occurrence frequency in topics classified out of the plurality of topics by a topic classification element under each principal component group.

The document analysis system having this configuration can compare the plurality of items with each other with respect to the latent topic in the plurality of documents about each item.

It is preferable that the document analysis system according to the present invention further include a regression analysis element configured to, when answer documents included in survey results as the plurality of documents are assumed to be constituted by topics of the reference topic count in accordance with the topic model, perform regression analysis by using marks given to a plurality of fields included in the survey results as target variables and a topic distribution as an explanatory variable.

The document analysis system having this configuration can estimate a topic distribution suitable to increase marks given by a survey respondent to the plurality of fields.

It is preferable that in the document analysis system according to the present invention the regression analysis element be configured to invert a sign of the topic distribution regarding particular answer documents including negative content out of the answer documents included in the survey results into a minus and perform regression analysis.

The document analysis system having this configuration can clarify the topic distribution in accordance with signs or polarities by differentiating between positive and negative contents of the answer documents included in the survey results; and as a result, it is possible to estimate, by performing regression analysis, a topic distribution more suitable to increase marks given by a survey respondent to the plurality of fields.

DETAILED DESCRIPTION OF THE PREFERRED EMBODIMENT

Configuration

Figure 1:
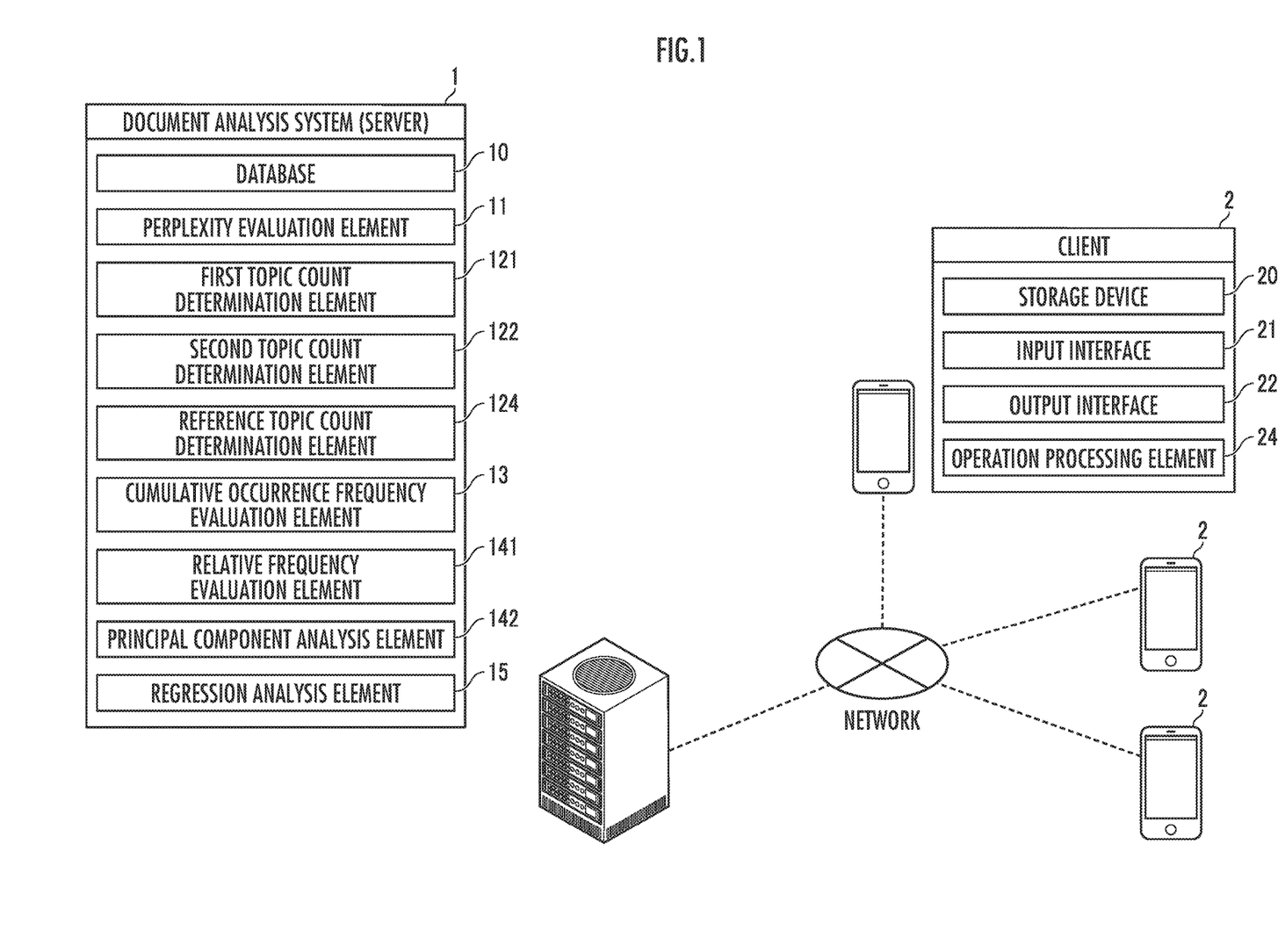
FIG. 1 illustrates a configuration of a document analysis system as an embodiment of the present invention.

A document analysis system as an embodiment of the present invention illustrated in FIG. 1 is implemented as a document analysis server 1 capable of mutually communicating with clients 2 through a network.

The document analysis server 1 includes a database 10, a perplexity evaluation element 11, a first topic count determination element 121, a second topic count determination element 122, a reference topic count determination element 124, a cumulative occurrence frequency evaluation element 13, a principal component analysis element 14, and a regression analysis element 15. The document analysis server 1 may be implemented as a mobile terminal device, such as a smartphone or a tablet computer. The document analysis server 1 may be a constituent element (for example, a graphical user interface (GUI)) of the client 2.

The database 10 retains, for example, documents d. The database 10 may be implemented as a database server different from the document analysis server 1. The elements constituting the document analysis server 1 are implemented as operation processing devices. The operation processing devices are constituted by one or more central processing units (CPUs) configured to read required software (or program) and data from a memory and perform a predetermined processing operation by using the data in accordance with the software, and additionally, a communication device, a storage device (the memory), and the like as needed. Details of the predetermined processing operation will be described later. At least a part of the processing operation result can be transmitted or downloaded from the document analysis server 1 or the database 10 to the client 2 and displayed on a display device constituting an output interface 22 of the client 2.

The client 2 is implemented as, for example, a mobile terminal device, such as a smartphone or a tablet computer. "Mobile" denotes that, for example, the size is about the average size of the palm of the human hand and the weight enables the terminal device to be easily carried with one hand or in a pocket in a garment or the like. The client 2 may be implemented as a device larger and heavier than the mobile device (for example, a device installed in a vehicle 4).

The client 2 includes a storage device 20, an input interface 21, the output interface 22, and an operation processing element 24.

The storage device 20 is configured to retain a processing operation result computed by the operation processing element 24 and the like.

The input interface 21 is constituted by an operating button, a microphone, and the like. The input interface 21 enables user's operation with contact or contactless operation using user's utterance. The output interface 22 is constituted by a display device and an audio output device (speaker). The output interface 22 displays an image content such as client map information or outputs an audio content. The input interface 21 and the output interface 22 may be implemented as touch panel displays.

The operation processing element 24 is constituted by an information processer (CPU) configured to read software and data from a particular area of a memory constituting the storage device 20 as needed and perform a predetermined processing operation by using the data in accordance with the software, and additionally, a communication device, a storage device (the memory), and the like as needed.

Functions

Determination of Reference Topic Count

Figure 2:
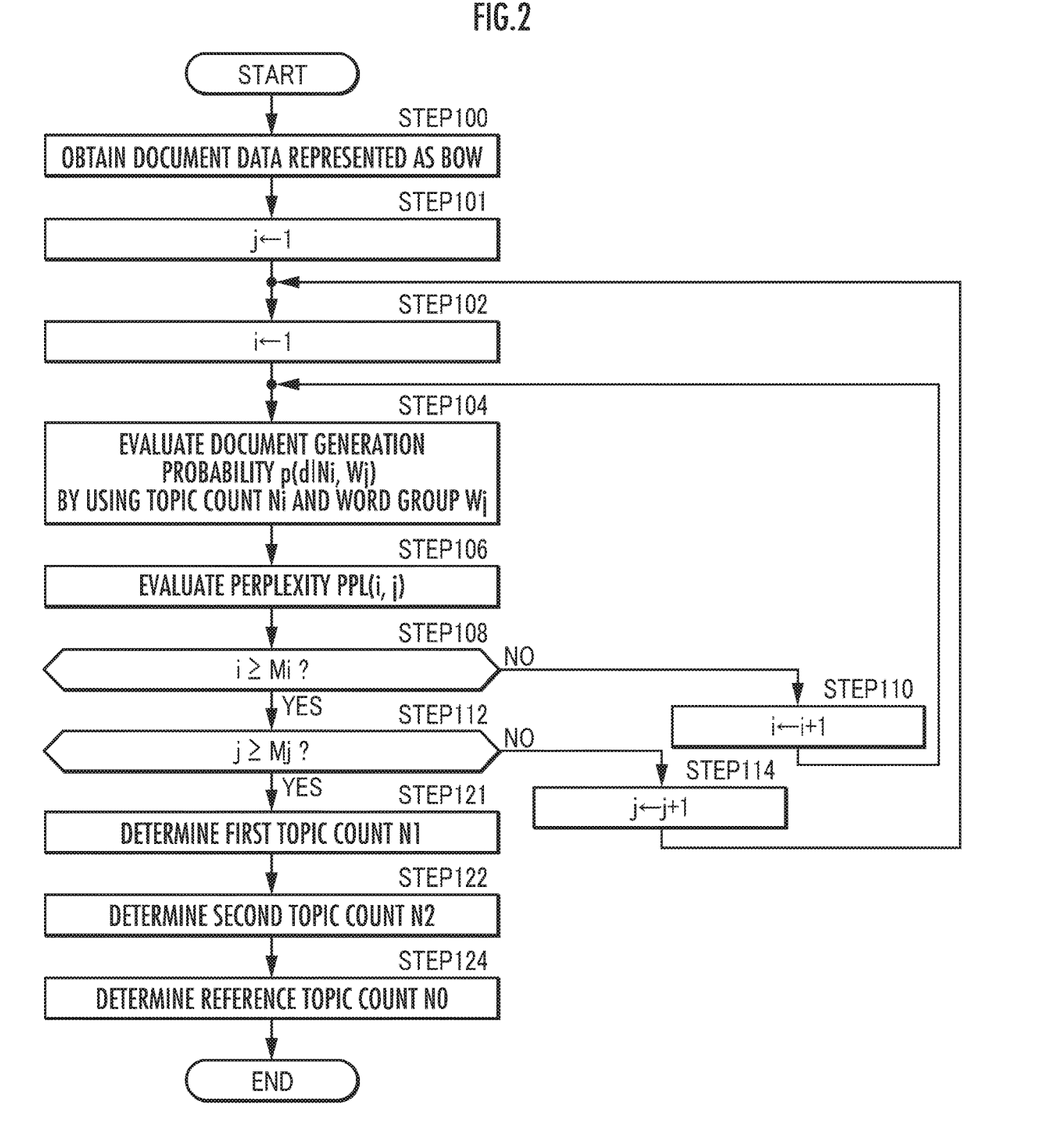
FIG. 2 illustrates a first function of the document analysis system as the embodiment of the present invention.

The perplexity evaluation element 11 obtains from the database 10 the documents d represented as multisets or bags of words (BOW) in accordance with a topic model (STEP 100 in FIG. 2). Each document d recorded in the database 10 is, for example, inputted by a user with the use of the input interface 21 of the client 2 and transmitted or uploaded to the document analysis server 11 by using the output interface 22 of the client 2 (or a communication device constituting the output interface 22).

An index j is determined as "1", where the index j represents a random number or a word group $W_j=\{w_{j1}, w_{j2}, \ldots, w_{jk}, \ldots\}$ specified by the random number (STEP 101 in FIG. 2). An index i is determined as "1", where the index i represents a topic count $N_i$ as the number of topics used to determine the topic model (STEP 102 in FIG. 2).

The perplexity evaluation element 11 computes a document generation probability $p(d|N_i, W_j)$ of each document d by using the topic counts $N_i$ and the word groups $W_j$ in accordance with LDA that is a document generation model (STEP 104 in FIG. 2). According to the LDA, probabilities $\theta_d=(\theta_{d,1}, \theta_{d,2}, \ldots, \theta_{d,N})$, which are probabilities about the occurrence of a topic k (k=1, 2, ..., N) in the document d, correspond to a Dirichlet distribution $Dir(\theta|\alpha)$; a distribution $\varphi_{k,w}$ about the occurrence of a word w in the topic k corresponds to a Dirichlet distribution $Dir(\varphi|\beta)$. The hyperparameters a and R of the Dirichlet distributions are fixed in the computation.

The perplexity evaluation element 11 evaluates the reciprocal of a geometric mean of the generation probability $p(d|N_i, W_j)$ of each document d as a perplexity $PPL(N_i, W_j)$ (STEP 106 in FIG. 2). The perplexity PPL is a measurement of ambiguity of information and evaluated in accordance with Expression (01).

$$PPL=2^{H(d|\alpha;\Phi)} \tag{01}$$

H(x) is an entropy and defined as Expression (02) in accordance with the generation probability $p(d|N_i, W_j)$ of the document d.

$$H(d|N_i, W_j)=-\Sigma_i \Sigma_{ij} p(d|N_i, W_j) \log 2p(d|N_i, W_j) \tag{02}$$

Next, it is determined whether the index i is equal to or greater than a predetermined value $M_i$ (STEP 108 in FIG. 2). When the determination result is negative (NO in STEP 108 in FIG. 2), the index i is increased by an increment of "1" (STEP 110 in FIG. 2), and subsequently, the computation processing for the document generation probability $p(d|N_i, W_j)$ of each document d (STEP 104 in FIG. 2) and the evaluation processing for the perplexity $PPL(N_i, W_j)$ (STEP 106 in FIG. 2) are repeated.

When the determination result is affirmative (YES in STEP 108 in FIG. 2), it is determined whether the index j is equal to or greater than a predetermined value $M_j$ (STEP 112 in FIG. 2). When the determination result is negative (NO in STEP 112 in FIG. 2), the index j is increased by an increment of "1" (STEP 114 in FIG. 2) and the index i is reset to "1" (STEP 102 in FIG. 2); and subsequently, the computation processing for the document generation probability $p(d|N_i, W_j)$ of each document d (STEP 104 in FIG. 2) and the evaluation processing for the perplexity $PPL(N_i, W_j)$ (STEP 106 in FIG. 2) are repeated.

Figure 3:
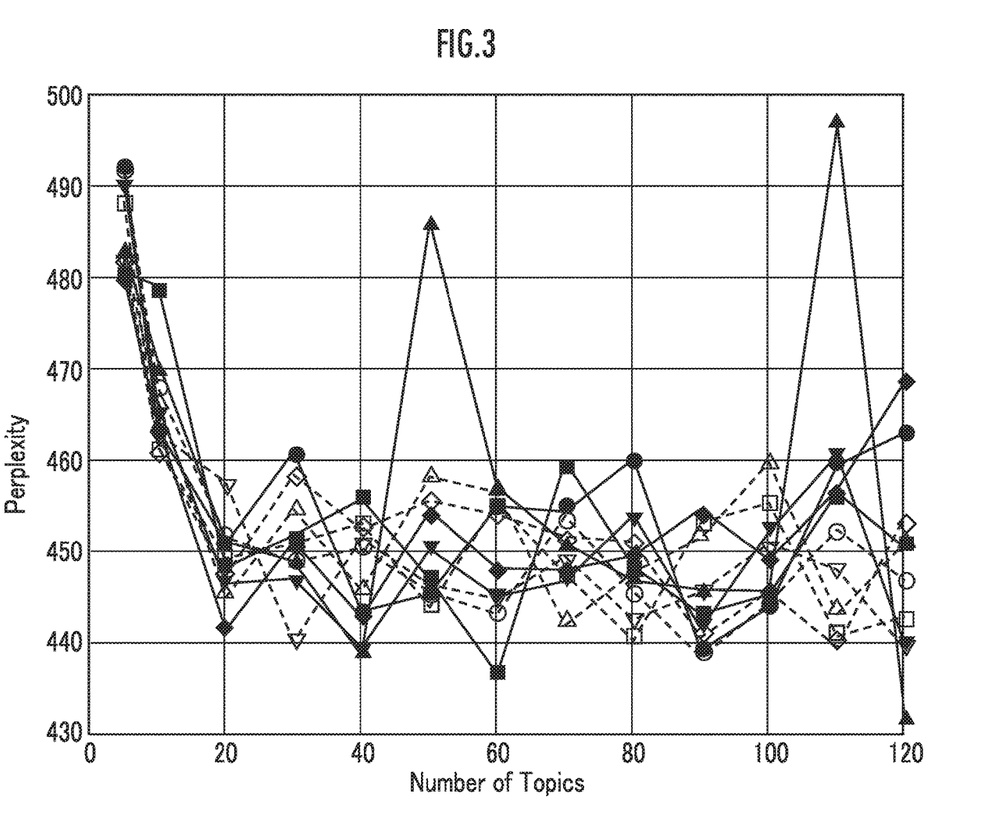
FIG. 3 illustrates evaluation results regarding perplexity.

FIG. 3 indicates evaluation results about the perplexity $PPL(N_i, W_j)$ with respect to different topic counts $N_1$=5, $N_2$=10, $N_3$=20, $N_4$=30, $N_5$=40, $N_6$=50, $N_7$=60, $N_8$=70, $N_9$=80, $N_{10}$=90, $N_{11}$=100, $N_{12}$=110, and $N_{13}$=120, and ten word groups WW respectively specified by different random numbers.

When the determination result is affirmative (YES in STEP 112 in FIG. 2), the first topic count determination element 121 determines as a first topic count $S_1$ a particular topic count that indicates a highest cumulative frequency at which the perplexity $PPL(N_i, W_j)$ first reaches a minimum value, in accordance with the rate of perplexity change (RPC) (STEP 121 in FIG. 2). When the latent topic count is 30 or more, the RPC of the perplexity PPL is relatively high, and the RPC is evaluated in accordance with Relation (03).

$$RPC_i = -(P_i - P_{i-1})/(t_i - t_{i-1}) \qquad (03)$$

Figure 4A:
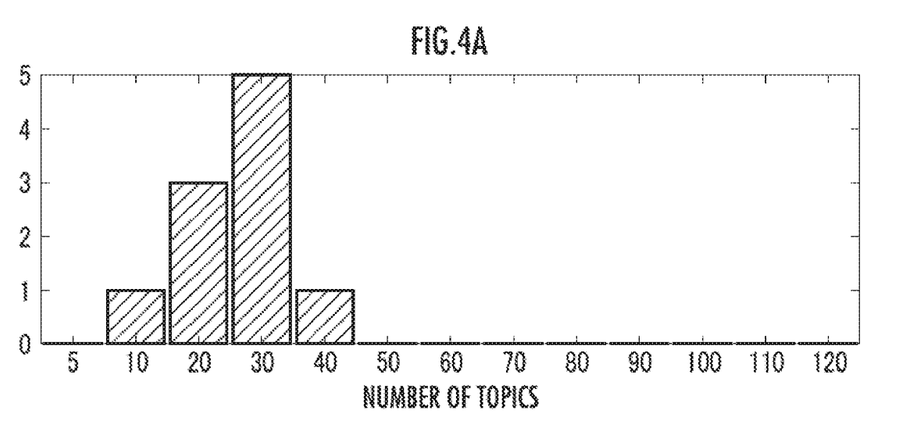
FIG. 4A is a graph indicating a frequency at which the perplexity first indicates a minimum value.

A particular latent topic count with a particular RPC that falls below 0 for the first time, that is, a particular latent topic count immediately before the perplexity PPL increases for the first time is selected as an optimum value. FIG. 4A is a histogram indicating cumulative frequencies at which the perplexity $PPL(N_i, W_j)$ first indicates a minimum value with respect to the topic counts $N_1$ to $N_{13}$ in accordance with the evaluation results illustrated in FIG. 3. According to the practical example indicated in FIG. 4A, the topic count "30 (=1$N_4$)" is determined as the first topic count Sr.

Figure 4B:
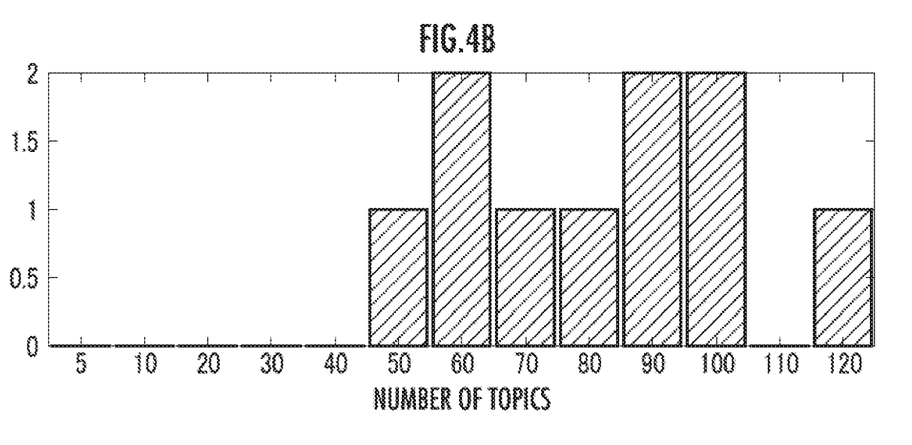
FIG. 4B is a graph indicating a frequency at which the perplexity indicates a smallest value.

Similarly, the second topic count determination element 122 determines as a second topic count $S_2$ a particular topic count that indicates a highest cumulative frequency at which the perplexity $PPL(N_i, W_j)$ reaches a smallest value (STEP 122 in FIG. 2). FIG. 4B is a histogram indicating cumulative frequencies at which the perplexity $PPL(N_i, W_j)$ indicates a smallest value with respect to the topic counts $N_1$ to $N_{13}$ in accordance with the evaluation results illustrated in FIG. 3. According to the practical example indicated in FIG. 4B, any one of the topic counts 60 (=$N_7$), 90 (=$N_{10}$), and 100 (=$N_{11}$), or the average value "83 (rounded to zero)" is determined as the second topic count $S_2$.

Subsequently, the reference topic count determination element 124 determines a reference topic count $S_0$ by combining the first topic count $S_1$ and the second topic count $S_2$ (STEP 124 in FIG. 2). For example, in accordance with Relation (04), a weighted sum of the first topic count $S_1$ and the second topic count $S_2$ may be determined as a reference topic count no.

$$n_0 = \gamma n_1 + (1-\gamma) n_2 \qquad (04)$$

"γ" is a positive number satisfying an inequality 0<γ<1. For example, when γ=0.5, 0.5×30+0.5×83=56 (rounded to zero) is determined as the reference topic count no. Alternatively, γ may be defined as a ratio of a largest value of frequency at which the perplexity PPL computed in accordance with the RPC indicates a smallest value to the sum of a largest value of frequency at which the perplexity PPL computed in accordance with the RPC indicates a smallest value and a largest value of frequency at which the perplexity PPL computed in accordance with the lowest perplexity indicates a smallest value. For example, in the example indicated in FIG. 4A, the largest value of frequency at which the perplexity PPL computed in accordance with the RPC indicates a smallest value is "5"; in the example indicated in FIG. 4B, the largest value of frequency at which the perplexity PPL computed in accordance with the lowest perplexity indicates a smallest value is "2"; accordingly, γ may be calculated as γ=5/(2+5)=0.71.

Evaluation of Cumulative Occurrence Frequency

Figure 5:
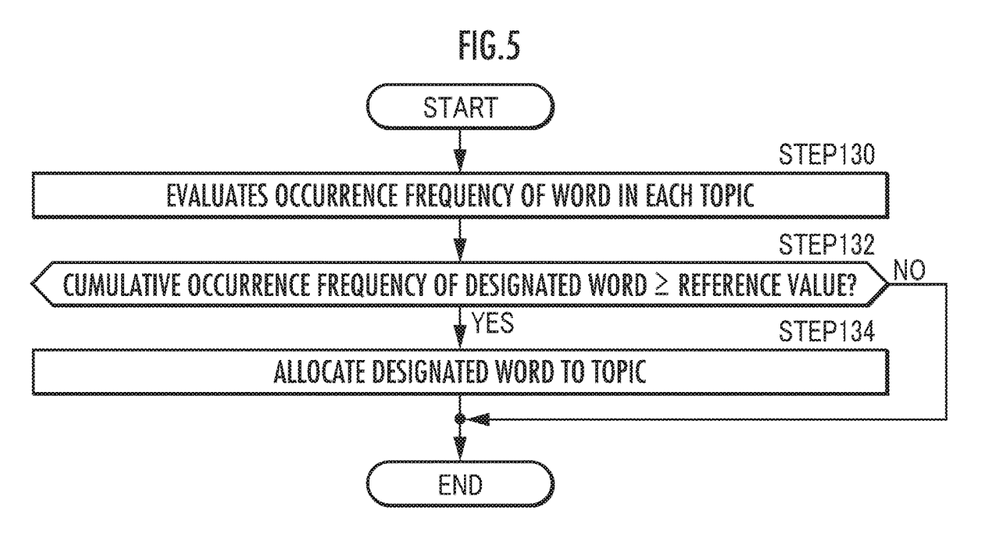
FIG. 5 illustrates a second function of the document analysis system as the embodiment of the present invention.
Figure 6:
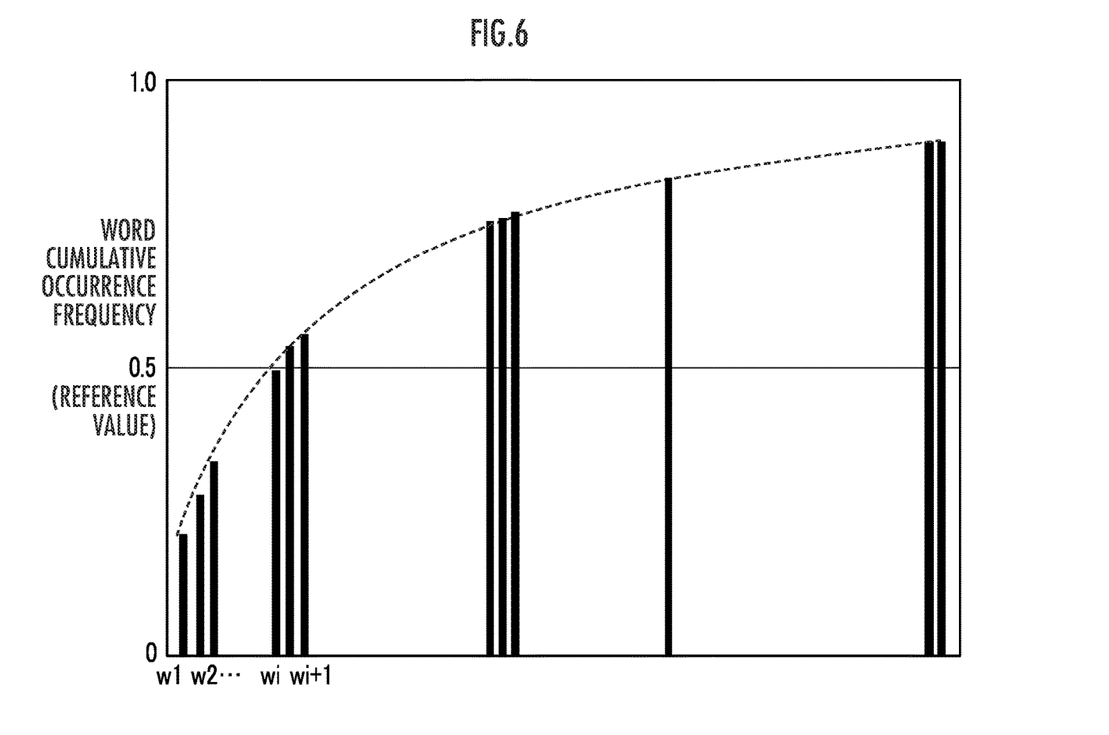
FIG. 6 is a graph about a cumulative word occurrence frequency.

Since the reference topic count No is determined, an occurrence frequency cp, which is a frequency of occurrences of the word w in a topic, is determined in the topic model with respect to a plurality of words w included in the plurality of documents d and the topics of the reference topic count $N_0$. The cumulative occurrence frequency evaluation element 13 evaluates a cumulative occurrence frequency of each of the words w included in the documents d with respect to each of the topics of the reference topic count $N_0$ (STEP 130 in FIG. 5). FIG. 6 illustrates cumulative occurrence frequencies $\Sigma_{i\varphi k,wi}$ of a plurality of words $w_1, \ldots, w_i, w_{i+1}, \ldots$ in the single topic k. The cumulative occurrence frequency of the word $w_i$ is calculated by sequentially adding the occurrence frequencies $\varphi_{k,wi}$ of words from the word $w_1$ with a higher occurrence frequency to the word $w_i$.

Subsequently, the cumulative occurrence frequency evaluation element 13 determines whether at least one designated word of the words w indicates a cumulative occurrence frequency equal to or greater than a reference value in at least one topic of the topics of the reference topic count no (STEP 132 in FIG. 5). For example, out of the words $w_1, \ldots, w_i, w_{i+1}, \ldots$ in the single topic k indicated in FIG. 6, a word group $\{w_1, \ldots, w_i, w_{i+1}\}$ indicates the cumulative occurrence frequencies $\Sigma_{i\varphi k,wi}$ equal to or greater than the reference value (for example, 0.5) and the word group includes a designated word, the determination result is affirmative. When the determination result is affirmative (YES in STEP 132 in FIG. 5), the cumulative occurrence frequency evaluation element 13 allocates the designated word to the topic k (STEP 134 in FIG. 5). When the designated word can be allocated to a plurality of topics k, the designated word is selectively allocated to a particular topic in which the designated word occurs at the highest cumulative occurrence frequency.

Principal Component Analysis

Figure 7:
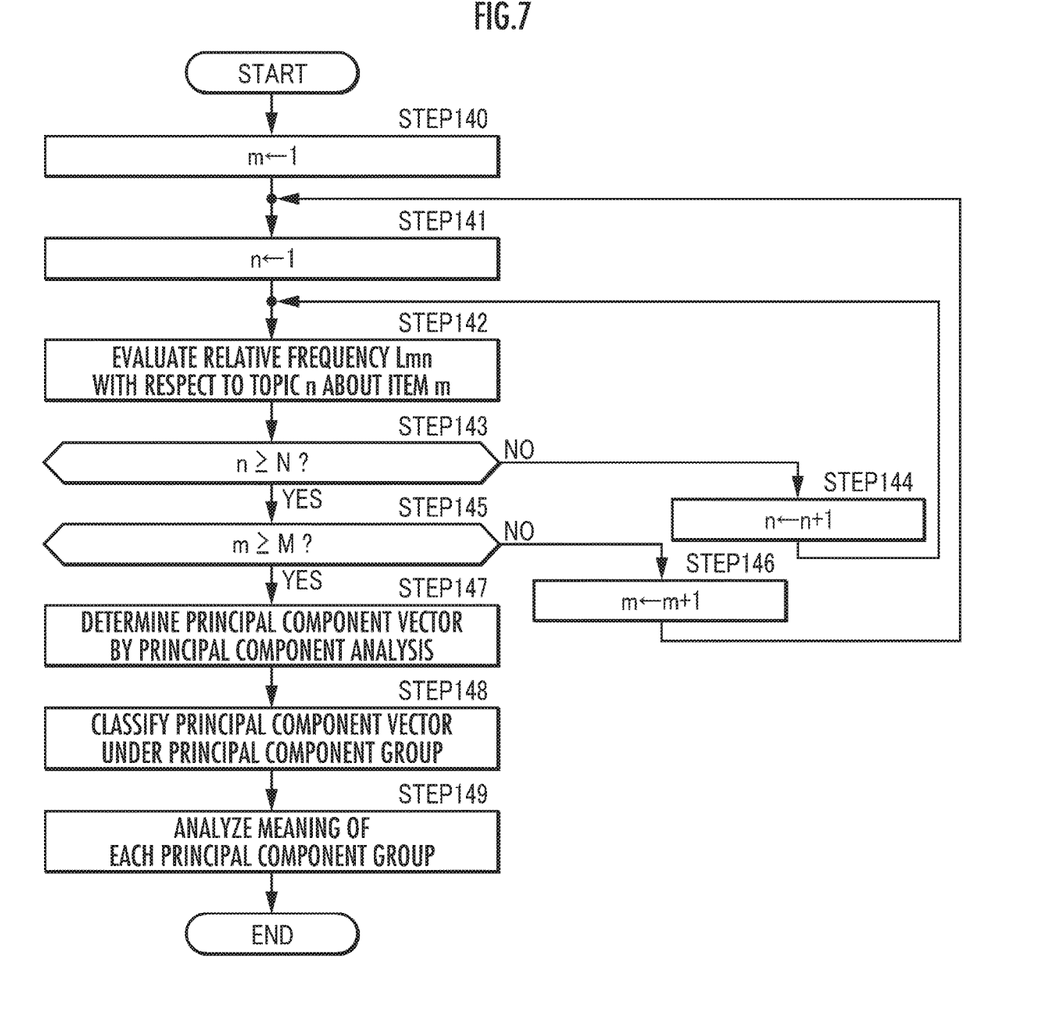
FIG. 7 illustrates a third function of the document analysis system as the embodiment of the present invention.

An index m is set to "1", where the index m is used to classify a plurality of items (for example, cars are classified in accordance with category, type, and the like) (STEP 140 in FIG. 7). An index n representing a topic is set to "1" (STEP 141 in FIG. 7).

A relative frequency evaluation element 141 evaluates a relative frequency $L_{mn}$ with respect to individual combinations of a plurality of items m and the topics n of the reference topic count $N_0$ (STEP 142 in FIG. 7). For example, the relative frequency $L_{mn}$ is computed in accordance with Relation (05).

$$L_{mn} = \{(X_n \cap Y_m)/X_n\}/\{Y_m/\eta D\} \qquad (05)$$

Figure 8:
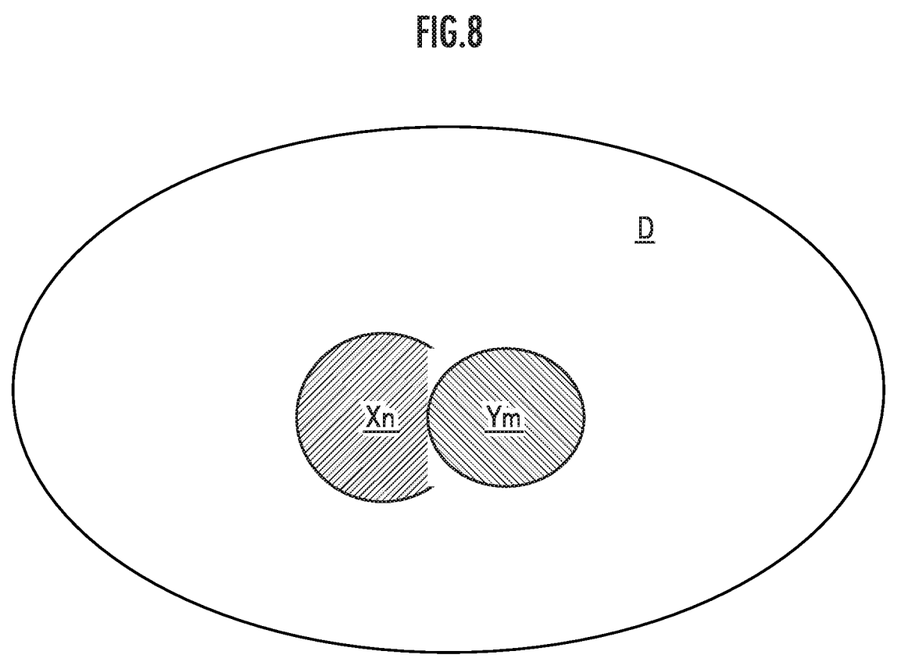
FIG. 8 illustrates a hyponymy relationship among document sets used to compute a relative frequency.

"D" represents a document count that is the number of documents included in a document set D. "$X_n$" represents a document count that is the number of documents included in a document set $X_n$ about the topic n (for example, one of the topics to which the designated word is allocated) out of the document set D. "$Y_m$" represents a document count that is the number of documents included in a document set $Y_m$ about the item m out of the document set D. "η" is an adjustment coefficient that is set to adjust the average value of the relative frequency $L_{mn}$ to "1". FIG. 8 illustrates the document sets D, $X_n$, and $Y_m$ in a conceptual manner. The relative frequency $L_{mn}$ represents a ratio of the rate of a document count about the item m out of the document count X n about the topic n to the rate of a document count about the item m out of the total document count D.

Subsequently, it is determined whether the index n is equal to or greater than a predetermined value N (STEP 143 in FIG. 7). When the determination result is negative (NO in STEP 143 in FIG. 7), the index n is increased by an increment of "1" (STEP 144 in FIG. 7), and the evaluation processing for the relative frequency $L_{mn}$ is repeated (STEP 142 in FIG. 7).

When the determination result is affirmative (YES in STEP 143 in FIG. 7), it is determined whether the index m is equal to or greater than a predetermined value M (STEP 145 in FIG. 7). When the determination result is negative (NO in STEP 145 in FIG. 7), the index m is increased by an increment of "1" (STEP 146 in FIG. 7), the index n is reset to "1" (STEP 141 in FIG. 7), and the evaluation processing for the relative frequency $L_{mn}$ is repeated (STEP 142 in FIG. 7).

Figure 9:
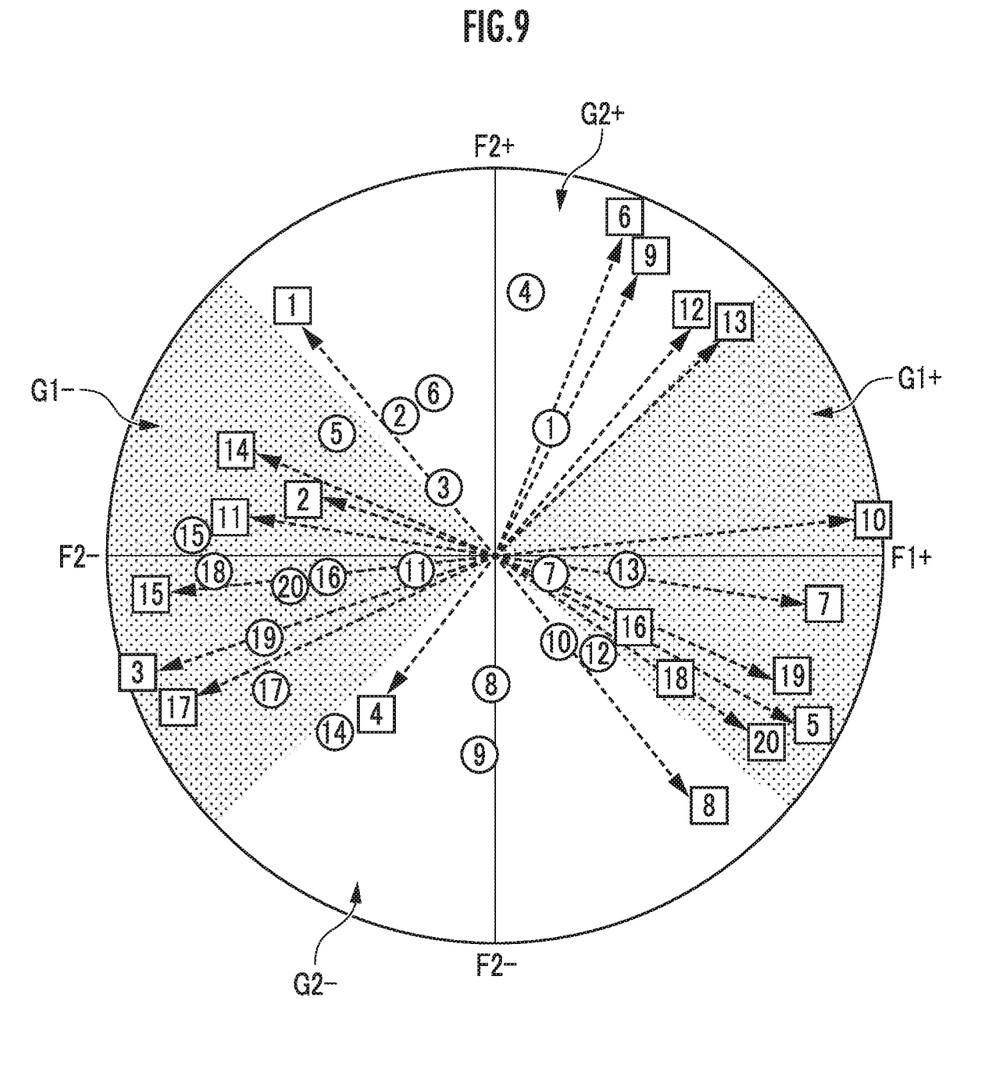
FIG. 9 illustrates results of principal component analysis.

When the determination result is affirmative (YES in STEP 145 in FIG. 7), a principal component analysis element 142 performs principal component analysis for the relative frequency $L_{mn}$ with respect to individual combinations of the items m and the topics n (STEP 147 in FIG. 7). As a result, a principal component vector is determined for each topic n and also for each item. FIG. 9 indicates a practical example in which the principal component vectors of the topics n (n=1 to 20) are indicated by numerals in squares and the principal component vectors of the items m (m=1 to 20) are indicated by numerals in circles.

The principal component analysis element 142 classifies the principal component vectors under a plurality of principal component groups in accordance with at least either the polarity of the principal component or the length of the principal component (STEP 148 in FIG. 7). In the practical example in FIG. 9, the principal component vectors representing the topics n and the items m are classified under a first positive principal component group $G_{1+}$, a second positive principal component group $G_{2+}$, a first negative principal component group and a second negative principal component group $G_{2-}$.

As for the principal component vector classified under the first positive principal component group $G_{1+}$, a first principal component $F_1$ is positive and greater than a second principal component $F_2$. In the practical example in FIG. 9, the principal component vectors of the topics 5, 7, 10, 13, 16, 18, 19, and 20 and the principal component vectors of the items 7 and 13 are classified as the first positive principal component group $G_{1+}$.

As for the principal component vector classified under the second positive principal component group $G_{2+}$, the second principal component $F_2$ is positive and greater than the first principal component $F_1$. In the practical example in FIG. 9, the principal component vectors of the topics 1, 6, 9, and 12 and the principal component vectors of the items 1, 2, 3, 4, and 6 are classified as the second positive principal component group $G_{2+}$.

As for the principal component vector classified under the first negative principal component group $G_1$, the first principal component $F_1$ is negative and greater than the second principal component $F_2$. In the practical example in FIG. 9, the principal component vectors of the topics 2, 3, 11, 14, 15, and 17 and the principal component vectors of the items 5, 11, and 15 to 20 are classified as the first negative principal component group $G_{1-}$.

As for the principal component vector classified under the second negative principal component group $G_{2-}$, the second principal component $F_2$ is negative and greater than the first principal component $F_1$. In the practical example in FIG. 9, the principal component vectors of the topics 4 and 8 and the principal component vectors of the items 8, 9, 10, 12, and 14 are classified as the second negative principal component group $G_{2-}$.

The principal component analysis element 142 analyzes, with respect to a plurality of principal component groups, the meaning of each principal component group in accordance with words indicating word occurrence frequencies equal to or greater than a predetermined value in the topic n classified as the principal component group (STEP 149 in FIG. 7). For example, in the practical example in FIG. 9, the meaning of the first positive principal component group $G_{1+}$ is analyzed in accordance with words indicating occurrence frequencies equal to or greater than the predetermined value in each of the topics 5, 7, 10, 13, 16, 18, 19, and 20 classified as the first positive principal component group $G_{1+}$.

Figure 10:
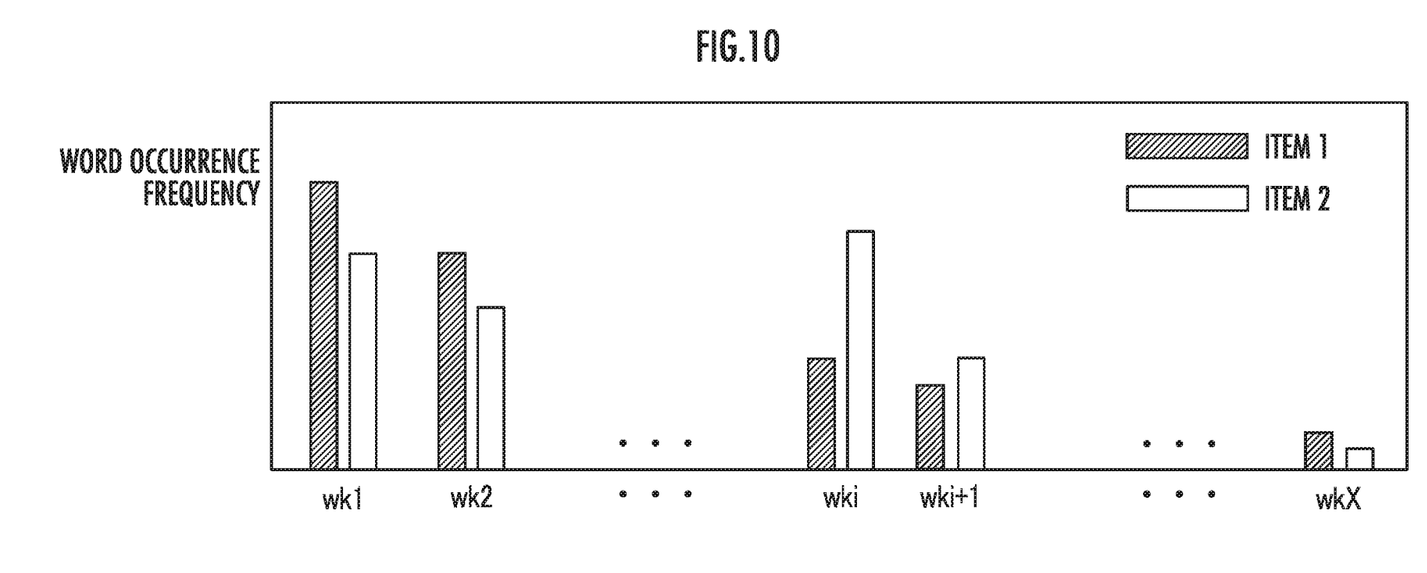
FIG. 10 illustrates comparison results between different items with respect to a word occurrence frequency.

The principal component analysis element 142 may compare a plurality of items with respect to the occurrence frequency of words in topics classified as each of the plurality of principal component groups. FIG. 10 illustrates comparison results regarding the items 1 and 2 with respect to the occurrence frequencies of a plurality of words $w_{k1}$, $w_{k2}$, ... $w_{ki}$, $w_{ki+1}$, ... that occur in the topics classified as the first positive principal component group $G_{1+}$. As illustrated in FIG. 10, the contextual meanings of words occurring in a document created by a user with regard to the item 1 is compared to the contextual meanings of words occurring in a document created by a user with regard to the item 2, and accordingly, the item 2 can be compared with the item 1 with respect to, for example, the market position.

Survey Result Analysis

A survey sheet including separate columns for comments indicating satisfaction and comments indicating dissatisfaction (improvement is required) of the respective items m and a marking column for related questions is outputted by using the output interface 22 of the client 2. The comments indicating satisfaction or dissatisfaction entered on the survey sheet by a user with the use of the input interface 21 are transmitted as the documents d together with marks to the document analysis server 1 and then obtained by the regression analysis element 15 (STEP 152 in FIG. 11). LDA processing is performed for the documents d and a topic distribution θ (>0) is determined for each item (refer to FIG. 2). Out of the topic distributions θ determined for the respective items, a particular topic distribution θ regarding comments indicating dissatisfaction is assigned a minus and converted into a negative value.

Figure 11:
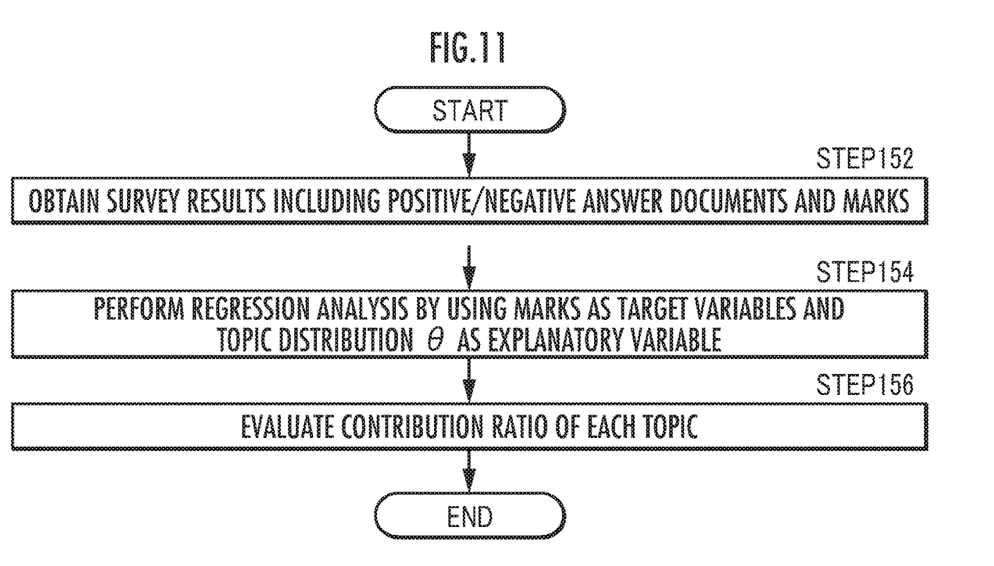
FIG. 11 illustrates a fourth function of the document analysis system as the embodiment of the present invention.

The regression analysis element 15 performs support vector regression (SVR) by using the marks given by a user as target variables and the topic distribution θ as an explanatory variable (STEP 154 in FIG. 11). The regression analysis element 15 computes a contribution ratio of the topic k indicating the topic distribution $θ_k$ to the mark (STEP 156 in FIG. 11).

Effects and Advantages

The document analysis server 1 evaluates, for a plurality of documents, a perplexity PPL of each document in accordance with a document generation probability in which each document d is generated when topic counts N for defining a topic model based on LDA as a document generation model are hypothetically specified as different values and word groups are specified by different random numbers (refer to Relation (01), STEP 106 in FIG. 2, and FIG. 3). A first topic count $N_1$ (the number of topics indicating a highest cumulative frequency at which the perplexity PPL first indicates a minimum value) and a second topic count $N_2$ (the number of topics indicating a highest cumulative frequency at which the perplexity PPL indicates a smallest value) can define a topic model that is a probabilistic model suitable to extract a latent topic or a contextual meaning from each document d (refer to STEPs 121 and 122 in FIG. 2, and FIG. 4A and FIG. 4B).

Hence, if only either one topic count (for example, $N_1$) defines the topic model, a latent meaning of a document, which can otherwise be estimated in accordance with the topic model defined by the other topic count (for example, $N_2$), may be omitted. Thus, the topic model is defined in accordance with the reference topic count $N_0$ determined by combining the first topic count $N_1$ and the second topic count $N_2$, and as a result, it is possible to establish a topic model more suitable to estimate the latent meaning of the document d (refer to STEP 124 in FIG. 2 and Relation (04)).

According to the topic model established in this manner, as the cumulative occurrence frequency of a particular word in a particular topic decreases, the probability that the contextual meaning of the particular word corresponds to the particular topic increases (refer to FIG. 6). As a result, in accordance with the evaluation result, in particular, the determination result of whether the cumulative occurrence frequency is equal to or less than the reference value, it is possible to highly accurately estimate the contextual meaning of a designated word in the documents used to establish the topic model (refer to STEP 130, YES in STEP 132, and STEP 134 in FIG. 5). By processing the topic count of LDA in a statistically optimum manner, it is possible to obtain highly accurate topic contents and also reduce the computation time. As a result, it is possible to properly evaluate the relationship between user's comments and the concept word presented by the carmaker.

The principal component analysis is performed for the relative frequency $L_{mn}$ of a combination of each item m and each topic n, and consequently, the correlation between the item and the topic can become tangible (refer to STEP 142, ... STEP 147, STEP 148, and STEP 149 in FIG. 7, and FIG. 9). Furthermore, it is possible to estimate the correlation between each item m and each topic n indicating the topic distribution θ determined in accordance with the topic model established by using the documents d regarding the items m.

When survey results with marks are analyzed as the documents d, it is possible to estimate a topic distribution suitable to gain for a plurality of fields higher marks given by a survey respondent (refer to STEP 152, STEP 154, and STEP 156 in FIG. 11). This means that it is possible to properly quantify the correlation between the user satisfaction and the comments in survey.

REFERENCE SIGNS LIST

1 Document analysis server (document analysis system), 2 Client, 10 Database, 11 Perplexity evaluation element, 121 First topic count determination element, 122 Second topic count determination element, 124 Reference topic count determination element, 13 Cumulative occurrence frequency evaluation element, 141 Relative frequency evaluation element, 142 Principal component analysis element, 15 Regression analysis element, 20 Storage device, 21 Input interface, 22 Output interface, 24 Operation processing element

What is claimed is:

1. A document analysis system comprising:
a perplexity evaluation element configured to evaluate, for a plurality of documents, a perplexity of each document in accordance with a document generation probability in which the document is generated when topic counts for defining a topic model based on latent dirichlet allocation (LDA) as a document generation model are hypothetically specified as different values and each of word groups are specified by each of different random numbers;
a first topic count determination element configured to accumulate frequencies at which the perplexity evaluated by the perplexity evaluation element indicates a local minimum value for a first time for each of the word groups specified by each of the different random numbers and determine, as a first topic count, a particular topic count among the topic counts that indicates a highest cumulative frequency at which the perplexity indicates the minimal value for the first time;
a second topic count determination element configured to accumulate frequencies at which the perplexity evaluated by the perplexity evaluation element indicates a smallest value for each of the word groups specified by each of the different random numbers and determine, as a second topic count, a particular topic count among the topic counts that indicates a highest cumulative frequency at which the perplexity indicates the smallest value;
a reference topic count determination element configured to determine a reference topic count by combining the first topic count determined by the first topic count determination element and the second topic count determined by the second topic count determination element;
a relative frequency evaluation element configured to, on the assumption that each of the plurality of documents regarding each of a plurality of items is constituted by a plurality of topics of the reference topic count in accordance with the topic model, evaluate a relative frequency with respect to a combination of each of the plurality of items and each of the plurality of topics of the reference topic count; and
a principal component analysis element configured to evaluate a principal component vector of each of the plurality of topics and a principal component vector of each of the plurality of items by performing principal component analysis for the relative frequency evaluated by the relative frequency evaluation element with respect to respective combination of each of the plurality of items and each of the plurality of topics for each of the plurality of items, wherein the principal component analysis element is configured to:
classify the plurality of topics under a plurality of principal component groups in accordance with at least one of a polarity of a principal component constituting a principal component vector of each of the plurality of topics and a size of the principal component, wherein the plurality of principal component groups include:
a first positive principal component group in which a first principal component of the principal component vector is positive and greater than a second principal component,
a second positive principal component group in which the second principal component of the principal component vector is positive and greater than the first principal component,
a first negative principal component group in which the first principal component of the principal component vector is negative and greater than the second principal component, and
a second negative principal component group in which the second principal component of the principal component vector is negative and greater than the first principal component, and
analyze a meaning of each of the plurality of principal component groups in accordance with a word indicating a word occurrence frequency equal to or greater than a predetermined value in topics classified under each of the plurality of principal component groups.

2. The document analysis system according to claim 1, further comprising:
a cumulative occurrence frequency evaluation element configured to evaluate, for each of a plurality of words included in the plurality of documents and each of topics of the reference topic count, a cumulative occurrence frequency of each word in each topic.

3. The document analysis system according to claim 2, wherein
the cumulative occurrence frequency evaluation element is configured to determine whether at least one designated word included in the plurality of words indicates the cumulative occurrence frequency equal to or less than a reference value in at least one topic of the topics of the reference topic count.

4. The document analysis system according to claim 1, wherein
the principal component analysis element is configured to compare the plurality of items with each other with respect to the word occurrence frequency in topics classified out of the plurality of topics by the topic classification element under each of the principal component groups.

5. The document analysis system according to claim 1, further comprising:
a regression analysis element configured to, on the assumption that answer documents included in survey results as the plurality of documents are constituted by topics of the reference topic count, perform regression analysis by using marks given by a survey respondent to a plurality of fields included in the survey results as target variables and a topic distribution as an explanatory variable, wherein the regression analysis is a set of statistical processes for estimating relationships between a target variable and one or more explanatory variables.

6. The document analysis system according to claim 5, wherein
the regression analysis element is configured to invert a sign of the topic distribution regarding particular answer documents, which include content out of the answer documents included in the survey results that are negative, into a minus and perform regression analysis.

* * * * *